United States Patent Office
3,398,184
Patented Aug. 20, 1968

3,398,184
POLYMERIZABLE ESTERS FROM UNSATURATED CARBOXYLIC ACID ANHYDRIDES AND CYCLIC ACETALS
Alexander Ramsay Maund Gibb, Barassie, Scotland, assignor to Imperial Chemical Industries Limited, London, England, a corporation of Great Britain
No Drawing. Filed July 20, 1964, Ser. No. 383,956
Claims priority, application Great Britain, July 23, 1963, 29,128/63
14 Claims. (Cl. 260—486)

ABSTRACT OF THE DISCLOSURE

New polymerizable unsaturated monomers of the formula

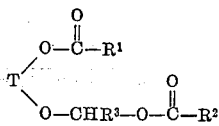

or

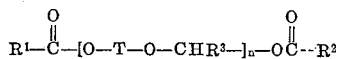

and a method of making the same. $R^1$ may be vinyl, $\alpha$-methyl vinyl or propenyl and $R^2$ may be the same as $R^1$ or methyl. The monomers are made by reacting an unsaturated carboxylic anhydride with a cyclic acetal having the formula

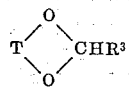

where $R^3$ is hydrogen or a vinyl radical and T is a divalent radical.

---

This invention relates to new and useful polymerizable and copolymerizable compounds and their preparation and also to polymers and copolymers thereof.

In accordance with the invention polymerizable compounds are prepared by reacting an unsaturated carboxylic acid anhydride of formula

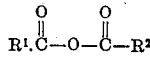

wherein
$R^1$ is a vinyl, $\alpha$-methylvinyl or propenyl radical
$R^2$ may be the same as $R^1$ or may additionally be a methyl radical
with a cyclic acetal of formula

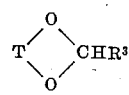

wherein
$R^3$ is hydrogen or a vinyl radical,
T is a divalent dimethylene, trimethylene or oxydimethylene radical or such a radical wherein one or more carbon atoms has an aliphatic substituent radical,
in the presence of an acidic or Friedel-Crafts catalyst.

The basic reaction may be represented in the following manner:

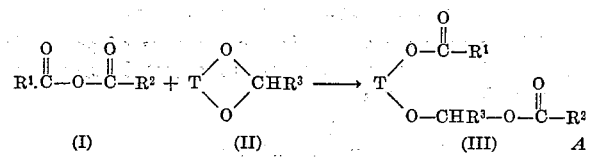

In the formation of compounds of Formula III according to reaction A the ring structure of the cyclic acetal of Formula II is opened and the two residues derived from the anhydride become attached to the open ends. In the compounds formed represented by Formula III the radicals $R^1$ and $R^2$ are interchangeable.

In reaction A one cyclic residue is combined with one anhydride molecule but we have found that with many of the compounds of Formula II, several cyclic residues may form a chain which in the reaction product is terminated by two anhydride residues. This form of the reaction may be represented in the following manner:

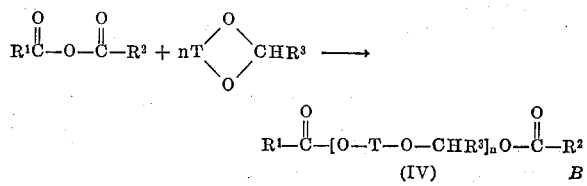

In Formula IV:
$R^1$, $R^2$, $R^3$, and T are as defined previously, and
$n$ is an integer greater than 1.

Reaction B is favoured when a cyclic compound of Formula II is present in stoichiometric excess.

Suitable unsaturated carboxylic acid anhydrides include acrylic anhydride, methacrylic anhydride, crotonic anhydride, the anhydrides of mixed linseed oil fatty acids and acetylmethacrylate.

Suitable cyclic acetals, include trioxane, 1,3-dioxolane, 4-methyl-1,3-dioxolane, neopentyl glycol cyclic formal, 1,3,5-trioxepane, 1,3,6-trioxocane and, pentaerythritol diformal.

Suitable catalysts include strong acids, Lewis acids, Friedel-Crafts catalysts and compounds which catalyze the cationic polymerization of monomers. Examples of such catalysts are perchloric acid, sulphuric acid, boron trifluoride and complexes thereof such as etherate and triethyl oxonium fluoroborate, ferric chloride, stannic chloride, stannic bromide and aluminum chloride. The amount of catalyst used may generally be less than 5 parts by weight of active constituent per hundred parts of total reactants.

The reaction may be carried out with the reactants only present or in an inert solvent, for example a hydrocarbon or chloro hydrocarbon which does not react with the catalyst or anhydride. Preferably the reaction is carried out at temperatures in the range —20° C. to 60° C. If the desired reaction temperature is above the boiling point of one of the reactants the process should be carried out under superatmospheric pressure.

On completion of the reaction it is advantageous to neutralize the catalyst or render it innocuous by addition of a small quantity of a base such as for example, triethylamine or sodium acetate.

As previously indicated, the proportions of the reactants used can influence the structure of the product obtained. Where it is desired to obtain a product in which the molar proportion of anhydride is equal to that of the acetal, ketal or orthoester, it will generally be advisable to use a theoretical excess of the anhydride and recover the unused excess, for example by distillation.

The compounds of the invention are suitable for polymerization and copolymerization by free radical catalysts such as benzoyl peroxide and azodiisobutyronitrile or by treatment with ultraviolet radiation.

The properties of the polymers obtained vary widely depending on the structure of the reactants and the proportions of the reactants used. In most cases the polymers are cross-linked to some extent and vary from soft friable jellies to hard rubbers and resins.

Especially useful substances are obtained when the polymerizable products of the invention are copolymerized with other unsaturated monomers. For example, polymerizable products of the invention prepared using acrylic, methacrylic anhydride or crotonic anhydride may be copolymerized with styrene, methyl methacrylate, or vinyl acetate. The polymers and copolymers of the invention may be incorporated with pigments and fillers.

The polymers and copolymers of the invention may be used in the preparation of sheets, films, surface coatings, resins, adhesives, rubbers and laminates and protective capsules for small electrical components. The suitability of the polymers and copolymers for any of these applications will, however, vary with the structure and molecular weight.

The invention is further illustrated by the following examples in which all parts are expressed by weight.

Example 1

A mixture of 28.5 parts acetylmethacrylate and 26.2 parts substantially pure, anhydrous trioxane was treated with 0.5 part boron trifluoride etherate, heated at 60° C. for several hours and left at room temperature for 24 hours. The resultant semi-solid mass was ground up in acetone containing a little triethylamine, filtered and dried to give 17.7 parts polyoxymethylene acetate methacrylate as a white solid, containing approximately 80 percent formaldehyde and melting between 128 and 140° C. Its infra-red spectrum was very similar to that of polyoxymethylene but showed in addition peaks ascribable to ester carbonyl and unsaturation. The mother liquors from the filtration were stripped at 12 mm. up to a temperature of 70°, leaving 13.6 parts oily residue which polymerized in contact with atmospheric oxygen to a soft jelly.

5 parts of this polyoxymethylene acetate methacrylate were added to 10 parts freshly distilled styrene heated to 110° C. The solid dissolved almost completely giving an almost clear solution. 0.02 part of tert-butyl hydroperoxide were added and the mixture was heated for 25 minutes at 110 to 120° and allowed to cool. The product obtained was an extremely hard, white opaque mass which, on heating, softened at about 110° but showed little further change up to a temperature of 280°, above which it decomposed.

Example 2

A mixture of 44.4 parts substantially pure anhydrous dioxolane, 18.9 parts acrylic anhydride and 0.006 part phenylhydrazine hydrochloride was cooled to −20° C., and 0.03 part boron trifluoride etherate was added with stirring. The mixture was kept at −20° C. for 2 hours and then allowed to reach room temperature. After a further hour it was neutralized to pH 8 to 9 with triethylamine and stripped free of unreacted starting material at 60 to 80° under a vacuum of 10 mm. mercury to leave 38.8 parts of polydioxolane diacrylate as a liquid product.

(i) A mixture of 8 parts of the polydioxolane diacrylate product, 40 parts styrene and 1.3 parts benzoyl peroxide was heated at 60° C. for 72 hours and was thereby converted to a hard, tough, almost transparent solid mass.

(ii) A mixture of 4 parts of the polydioxolane diacrylate, product, 8 parts styrene and 0.3 part benzoyl peroxide was heated for 12 hours at 60° C. The solid product was similar to that obtained with the higher proportion of styrene but was somewhat rubbery and resilient.

(iii) A mixture of 8 parts of the polydioxolane diacrylate product, 8 parts styrene and 0.3 part benzoyl peroxide was heated at 60° C. for 36 hours to give a hard, tough, almost transparent rubber. A cylinder of this rubber 6 inches long and ¾ inch diameter was bent at its mid-point through 180° so that the two halves of the walls were in contact and held in that position for 30 seconds, then released. The rod was completely straight within 40 seconds and the crease mark had disappeared within one minute.

Example 3

A mixture of 7.4 parts dioxolane, 7.4 parts trioxane, 6.3 parts acrylic anhydride and 0.002 part phenylhydrazine hydrochloride was stirred at room temperature and 0.1 part boron trifluoride etherate was added. The mixture was kept at room temperature for 2 hours, brought to pH 8 with triethylamine then stripped free of unchanged reactants to leave 16.6 parts of the diacrylate of a doxolane/trioxane copolymer as a yellow oil. A mixture of 80 parts of this oil, 40 parts styrene and 1.2 parts benzoyl peroxide was kept in a thin walled glass tube at 60° C. for 96 hours. The tube was removed and the solid remaining was cured for a further 48 hours at 40° C. to give an extremely hard, tough rod.

Example 4

0.1 part boron trifluoride etherate was added to a stirred mixture of 8 parts pentaerythritol diformal and 13 parts crotonic anhydride. An exothermic reaction occurred and the mixture was left for 1 hour then brought to pH 8 to 9 by addition of a little triethylamine. It was then heated under vacuum to remove any traces of starting material. 21 parts of a red oil, believed to be pentaerythritol dicrotonate di-(oxymethylcrotonate),

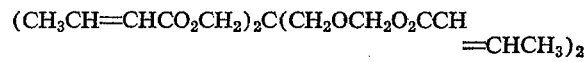

were obtained. Its infra-red spectrum showed the presence of unsaturation, an ester carbonyl group but no anhydride group.

A mixture of 2 parts of the crotonate product, 10 parts freshly distilled vinyl acetate and 0.3 part benzoyl peroxide was kept at 60° C. for 60 hours, to give a yellow, transparent, rather brittle rubber.

Example 5

0.1 part boron trifluoride etherate, dissolved in 1 part crotonic anhydride, was added at room temperature to a stirred mixture of 8.7 parts pentaerythritol bis(acrolein acetal) and 15 parts crotonic anhydride, in contact with air. The mixture became warm and immediately started to gel, and on heating at 60° C. for 2 hours had set to a soft, rather friable rubber.

Example 6

A mixture of 13.2 parts 4-methyldioxolane, 3.8 parts crotonic anhydride and 0.05 part boron trifluoride etherate was heated at 60° C. for 24 hours, then neutralized with triethylamine and stripped under vacuum to give 9.8 parts of a yellow liquid, poly(4-methyldioxolane)dicrotonate. Its infra-red spectrum indicated the presence of unsaturated ester and carbonyl linkages but no anhydride was indicated.

8 parts of the poly(4-methyldioxolane)dicrotonate product, 40 parts vinyl acetate and 12 parts benzoyl peroxide were heated 48 hours at 60°, then 48 hours at 50° in a glass tube 6 inch x ¾ inch. On removal of the tube, there was obtained a rod of hard, yellow, transparent rubber.

What we claim is:

1. A process for the preparation of a polymerizable unsaturated ester of the formula

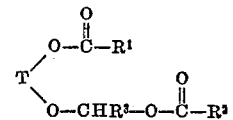

or

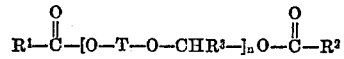

which comprises reacting, in the presence of an acidic or Friedel-Crafts catalyst, an unsaturated carboxylic anhydride of formula

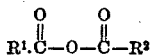

wherein $R^1$ is a vinyl, $\alpha$-methyl vinyl or propenyl radical, $R^2$ is vinyl, $\alpha$-methyl vinyl, propenyl or methyl radical, and $n$ is an integer greater than 1 with a cyclic acetal of formula

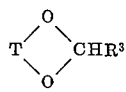

wherein $R^3$ is hydrogen or a vinyl radical, and T is a divalent dimethylene, trimethylene or oxydimethylene radical or such a radical wherein one or more carbon atoms has an aliphatic substituent radical.

2. A process as claimed in claim 1 wherein the carboxylic acid anhydride is acrylic anhydride, methacrylic anhydride, or crotonic anhydride.

3. A process as claimed in claim 1 wherein the cyclic acetal is trioxane, 1,3-dioxolane, 4-methyl-1,3-dioxolane, neopentyl glycol cyclic formal, 1,3,5-trioxepane, 1,3,6-trioxocane and pentaerythritol diformal.

4. A process as claimed in claim 1 wherein the catalyst is perchloric acid, sulphuric acid, boron trifluoride, boron trifluoride etherate, triethyl oxonium fluoroborate, ferric chloride, stannic chloride, stannic bromide, or aluminum chloride.

5. A process as claimed in claim 1 wherein the reaction is carried out at temperatures in the range −20 to 60° C.

6. A process as claimed in claim 1 wherein the catalyst is neutralized on completion of the reaction by addition of a small quantity of a base.

7. A process as claimed in claim 6 wherein the base is triethylamine or sodium acetate.

8. A polymerizable compound of the formula

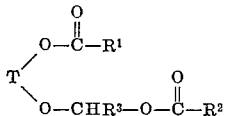

wherein $R^1$ is a vinyl, $\alpha$-methyl vinyl or propenyl radical, $R^2$ is vinyl, $\alpha$-methyl vinyl, propenyl or methyl radical, $R^3$ is hydrogen or a vinyl radical, and T is a divalent dimethylene, trimethylene or oxydimethylene radical or such a radical wherein one or more carbon atoms has an aliphatic substituent radical.

9. A polymerizable compound of the formula

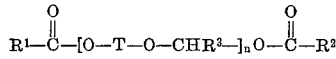

wherein $R^1$ is a vinyl, $\alpha$-methyl vinyl or propenyl radical, $R^2$ is vinyl, $\alpha$-methyl vinyl, propenyl or methyl radical, $R^3$ is hydrogen or a vinyl radical, and T is a divalent dimethylene, trimethylene or oxydimethylene radical or such a radical wherein one or more carbon atoms has an aliphatic substituent radical, and $n$ is an integer greater than 1.

10. Polyoxymethylene acetate methacrylate.
11. Polydioxolane diacrylate.
12. Diacrylate of dioxolane/trioxane copolymer.
13. Pentaerythritol dicrotonate di-(oxymethylcrotonate).
14. Poly(4-methyldioxolane)dicrotonate.

References Cited
UNITED STATES PATENTS

| | | | |
|---|---|---|---|
| 2,680,735 | 6/1954 | Fegley et al. | 260—86.1 |
| 2,917,484 | 12/1959 | Kray et al. | 260—67 |
| 3,010,918 | 11/1961 | Ikeda | 260—67 |
| 3,225,014 | 12/1965 | D'Alelio | 260—78.4 |
| 3,277,058 | 10/1966 | Bastian | 260—67 |
| 3,293,218 | 12/1966 | Sidi | 260 |

WILLIAM H. SHORT, *Primary Examiner.*

L. M. PHYNES, *Assistant Examiner.*